US009030813B2

(12) United States Patent
Chang et al.

(10) Patent No.: US 9,030,813 B2
(45) Date of Patent: May 12, 2015

(54) PORTABLE ELECTRONIC DEVICE

(71) Applicant: Quanta Computer Inc., Taoyuan Shien (TW)

(72) Inventors: Chun-Sen Chang, New Taipei (TW); Chuan-Yu Hsu, Taoyuan Shien (TW); Jung-Wen Chang, Taoyuan County (TW)

(73) Assignee: Quanta Computer Inc., Taoyuan Shien (TW)

( * ) Notice: Subject to any disclaimer, the term of this patent is extended or adjusted under 35 U.S.C. 154(b) by 196 days.

(21) Appl. No.: 13/940,322

(22) Filed: Jul. 12, 2013

(65) Prior Publication Data

US 2014/0192471 A1    Jul. 10, 2014

(30) Foreign Application Priority Data

Jan. 8, 2013    (TW) .............................. 102100569 A

(51) Int. Cl.
*H05K 7/00*    (2006.01)
*G06F 1/16*    (2006.01)
(52) U.S. Cl.
CPC .............. *G06F 1/1633* (2013.01); *G06F 1/162* (2013.01); *G06F 1/1681* (2013.01)
(58) Field of Classification Search
CPC ... F16M 2200/08; F16M 11/00; F16M 11/04; H05K 5/0234; G06F 1/166; G06F 1/1616; G06F 1/1681
See application file for complete search history.

(56) References Cited

U.S. PATENT DOCUMENTS

| 6,883,206 | B2* | 4/2005 | Yang et al. | 16/337 |
| 6,912,122 | B2* | 6/2005 | Chen et al. | 361/679.27 |
| 7,574,774 | B2* | 8/2009 | Chang et al. | 16/367 |
| 7,730,587 | B2* | 6/2010 | Chang et al. | 16/340 |
| 8,922,995 | B2* | 12/2014 | Su | 361/679.59 |
| 2007/0119025 | A1* | 5/2007 | Hu | 16/340 |
| 2012/0161541 | A1* | 6/2012 | Urano | 307/104 |
| 2014/0139982 | A1* | 5/2014 | Kuo et al. | 361/679.01 |

* cited by examiner

*Primary Examiner* — Robert J Hoffberg
*Assistant Examiner* — Hung Dang
(74) *Attorney, Agent, or Firm* — McClure, Qualey & Rodack, LLP

(57) ABSTRACT

A portable electronic device includes a tablet PC, a base panel and two supports. Two opposite ends of each support are respectively pivoted to the tablet PC and the base panel through a first pivotal portion and a second pivotal portion. The second pivotal portion includes a shaft rod fastened on one end of the support, a retractable spring, a fixed cam fastened on the base panel, and a rotary cam. The retractable spring, the fixed cam and the rotary cam are sleeved on the shaft rod. The fixed cam includes three first peaks, and a first cave is formed between any two of the first peaks. The rotary cam is rotated along the supports, abutted against the fixed cam and the retractable spring. The rotary cam includes three second peaks, and a second cave is formed between any two of the second peaks.

13 Claims, 12 Drawing Sheets

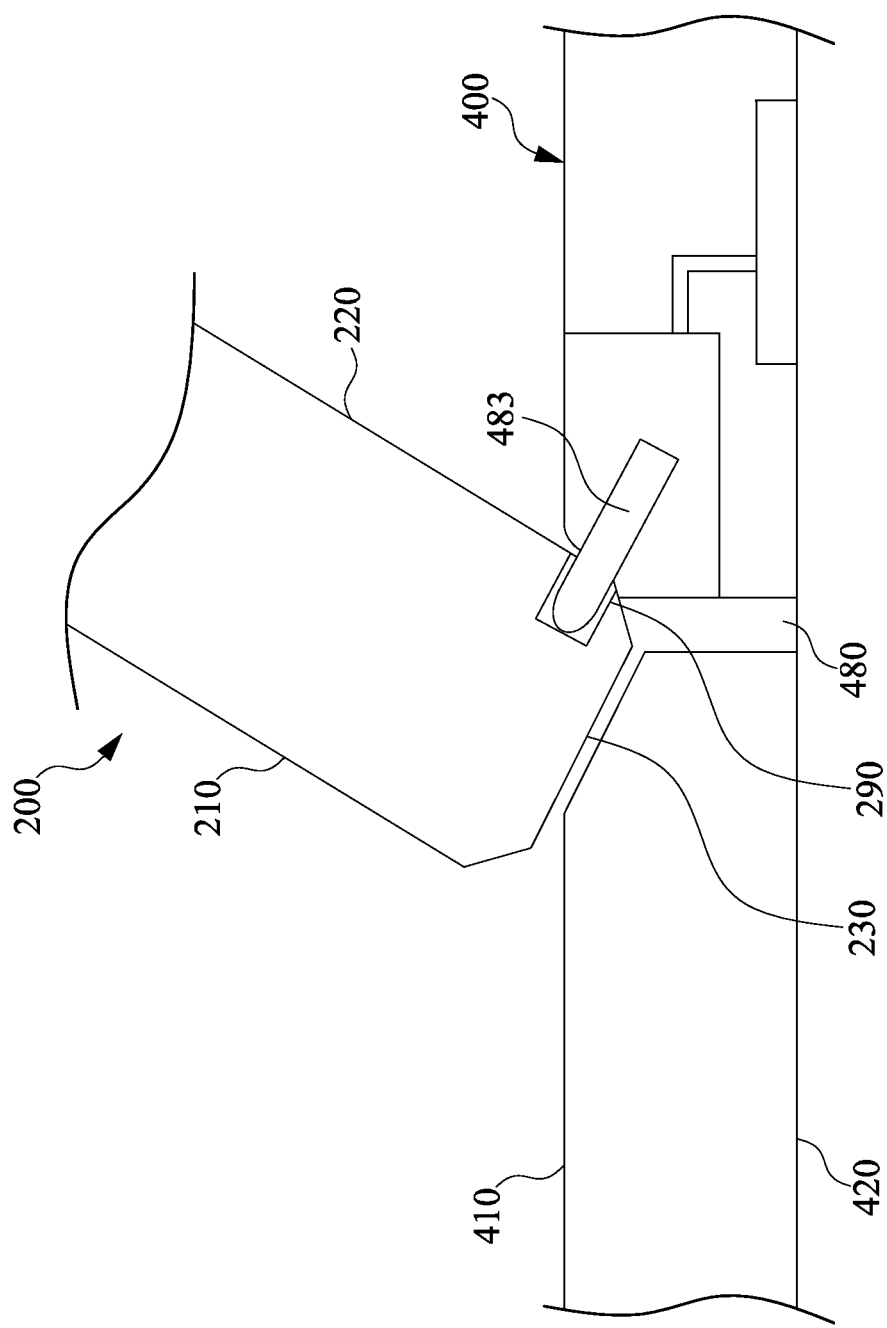

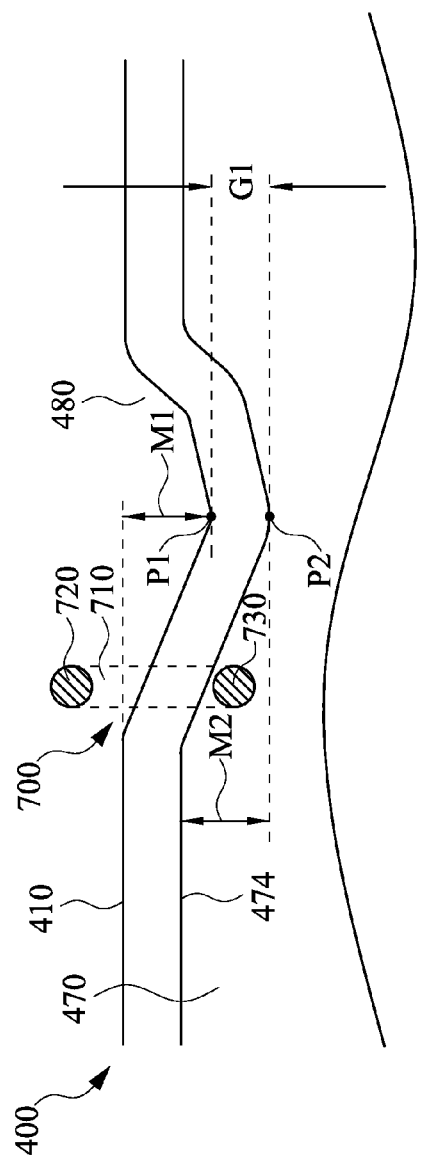
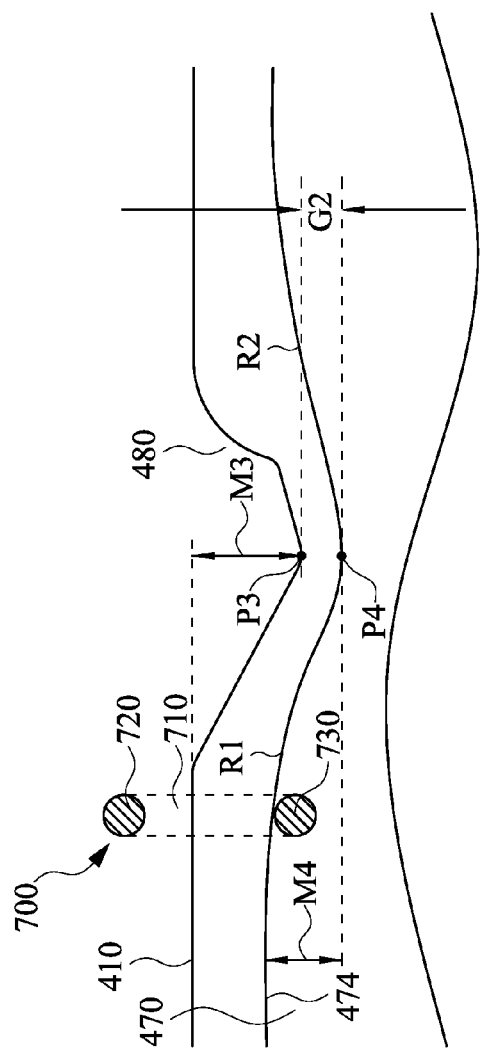
Fig. 10A
Fig. 10B

PORTABLE ELECTRONIC DEVICE

RELATED APPLICATIONS

This application claims priority to Taiwan Application Serial Number 102100569, filed Jan. 8, 2013, which is herein incorporated by reference.

BACKGROUND

1. Field of Disclosure

The disclosure relates to a portable electronic device. More particularly, the disclosure relates to a portable electronic device capable of semi-automatically unfolding for exposing an input interface.

2. Description of Related Art

A general tablet PC has features of light and thin, and easy to be carried around, and a user can use a touch screen installed on the tablet PC for inputting via touching or handwriting. In addition, a keyboard can be optionally provided to the tablet PC, so the tablet PC is enabled to obliquely stand on a base panel thereby allowing the user to adjust the viewing angle for the touch screen.

At present, the tablet PC can be pivoted with the base panel through a connection member, the user can select to stack the tablet PC on a front surface of the base panel or to obliquely stand on the front surface of the base panel by two ends of the connection member respectively rotating with the tablet PC and the base panel.

However, in the mentioned design, when the user desires to operate the tablet PC to stack or stand on the front surface of the base panel, the user has to empty the hands or suspend the work at hand before the user rotates and places the tablet PC on the front surface of the base panel.

Accordingly, how to provide a portable electronic device capable of overcoming the mentioned disadvantages shall be seriously concerned by skilled people in the art.

SUMMARY

The present disclosure discloses a portable electronic device, according to one embodiment, when a tablet PC of the portable electronic device is slightly pulled away from a base panel, the tablet PC of the portable electronic computer can be semi-automatically raised under an unfolding status thereby allowing the tablet PC to rapidly stand on the base panel.

The present disclosure discloses a portable electronic device, according to one embodiment, when a tablet PC of the portable electronic device is stacked on a base panel, the tablet PC can uncover a touch screen thereof, or can cover and protect the touch screen.

According to one embodiment of the present disclosure, the portable electronic device includes a tablet PC, a base panel and two supports. The tablet PC includes a touch screen. Each of the supports includes a first end and a second end which are oppositely arranged with each other. The first ends are respectively pivoted with two opposite lateral surfaces of the tablet PC through a first pivotal portion. The second ends are respectively pivoted with two opposite lateral surfaces of the base panel through a second pivotal portion. Each of the second pivotal portions includes a shaft rod, a retractable spring, a three-peak fixed cam and a three-peak rotary cam. One end of the shaft rod is fastened on the second end of the support. The retractable spring is sleeved on the shaft rod. The three-peak fixed cam is sleeved on the shaft rod and fastened on the base panel. The three-peak fixed cam includes three first peaks spaced with equal intervals, and every two of the first peaks forms a first cave. The three-peak rotary cam is sleeved on the shaft rod and rotated along the supports, and two ends of the three-peak rotary cam are respectively abutted against the three-peak fixed cam and the retractable spring. The three-peak rotary cam includes three second peaks spaced with equal intervals, and every two of the second peaks forms a second cave.

Thus, when the tablet PC is stacked on the base panel, the second peaks are respectively abutted against the first peaks thereby compressing the retractable spring; when the retractable spring allows the second peaks to be respectively received and abutted against the first caves, the supports raise the tablet PC for allowing the tablet PC to stand on the base panel, at this moment, an included angle about 50 to 60 degrees is formed between the base panel and each of the supports.

According to what has been disclosed above, when the tablet PC is stacked on the base panel, the portable electronic device provided by the present disclosure allows the user to slightly pull the tablet PC and the base panel, then the retractable spring allows the second peaks to be respectively received and abutted against the first caves, so the supports are able to drive the tablet PC to be automatically raised so as to stand on the base panel, thereby providing convenience for operating the portable electronic device and increasing the willingness for the user to purchase and use the portable electronic device.

Moreover, because the three-peak fixed cam and the three-peak rotary cam are respectively formed with the three peaks and the three caves, when each of the peaks of the three-peak rotary cam is received in the corresponding cave from each of the peaks of the three-peak fixed cam, the three-peak rotary cam only needs to be rotated about 50 to 60 degrees. Therefore, only rotating the supports for about 50 to 60 degrees can allow the tablet PC to stand on the base panel, so the action angle is prevented from being overly large, the raising motion of the tablet PC can be kept to be smooth, and the location where the tablet PC standing on the base panel can be ensured.

BRIEF DESCRIPTION OF THE DRAWINGS

The present disclosure will be apparent to those skilled in the art by reading the following detailed description of a preferred embodiment thereof, with reference to the attached drawings, in which:

FIG. 8 is a partial cross sectional view showing the portable electronic device being in the unfolding status according to another embodiment of the present disclosure;

FIG. 10A is a schematic view showing the operation of the front surface of the base panel, the top inner surface of the guide slot and the connection member of the portable electronic device according to a first embodiment of the present disclosure; and FIG. 10B is a schematic view showing the operation of the front surface of the base panel, the top inner surface of the guide slot and the connection member of the portable electronic device according to a second embodiment of the present disclosure.

DETAILED DESCRIPTION

The spirit of the disclosure will be described clearly through the drawings and the detailed description as follows. Any person of ordinary skills in the art can make modifications and variations from the technology taught in the disclosure after understanding the embodiments of the disclosure, without departing from the spirit and scope of the disclosure.

Figure 1:
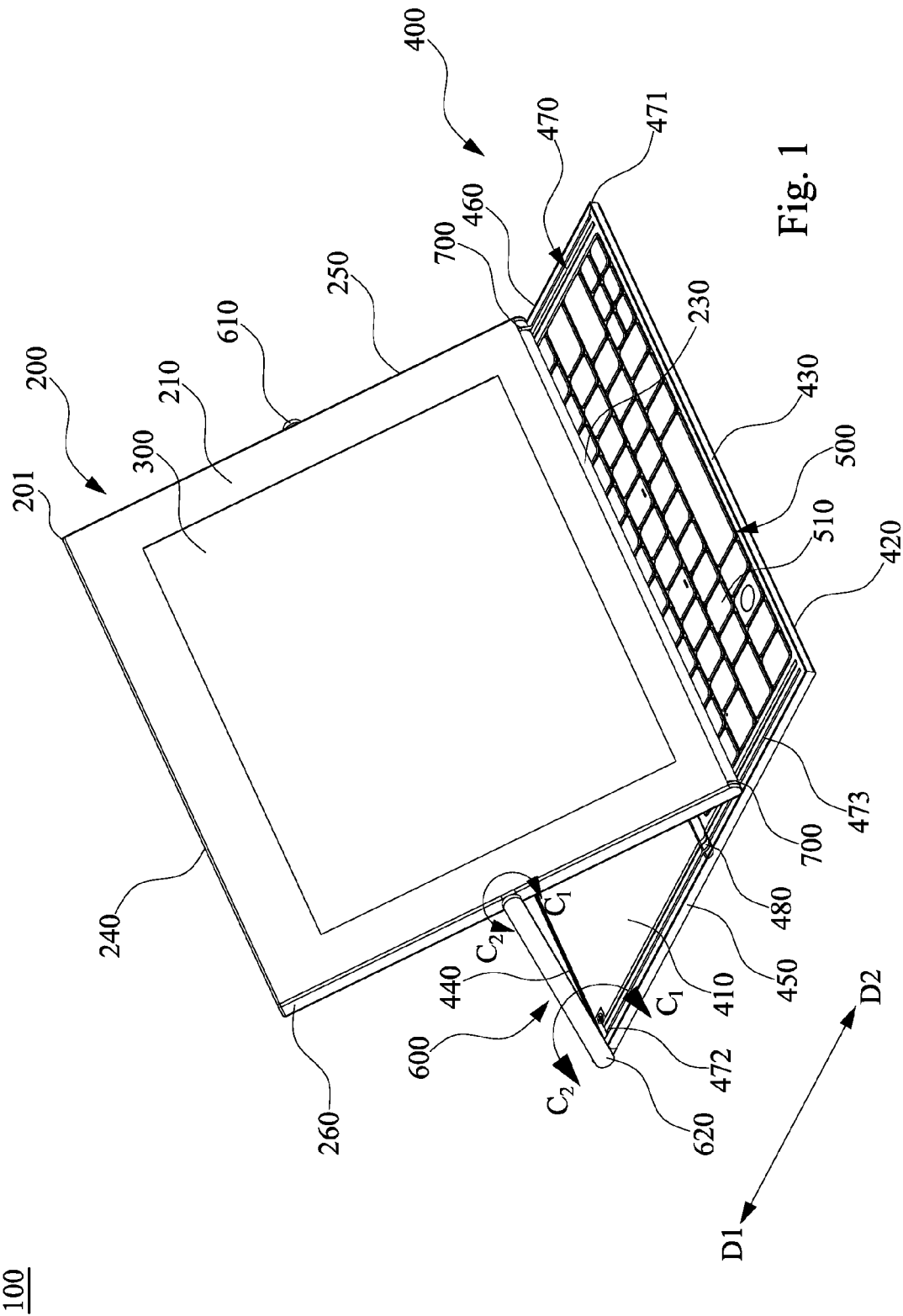
FIG. 1 is a schematic view showing the portable electronic device being in an unfolding status according to the present disclosure.
Figure 2:
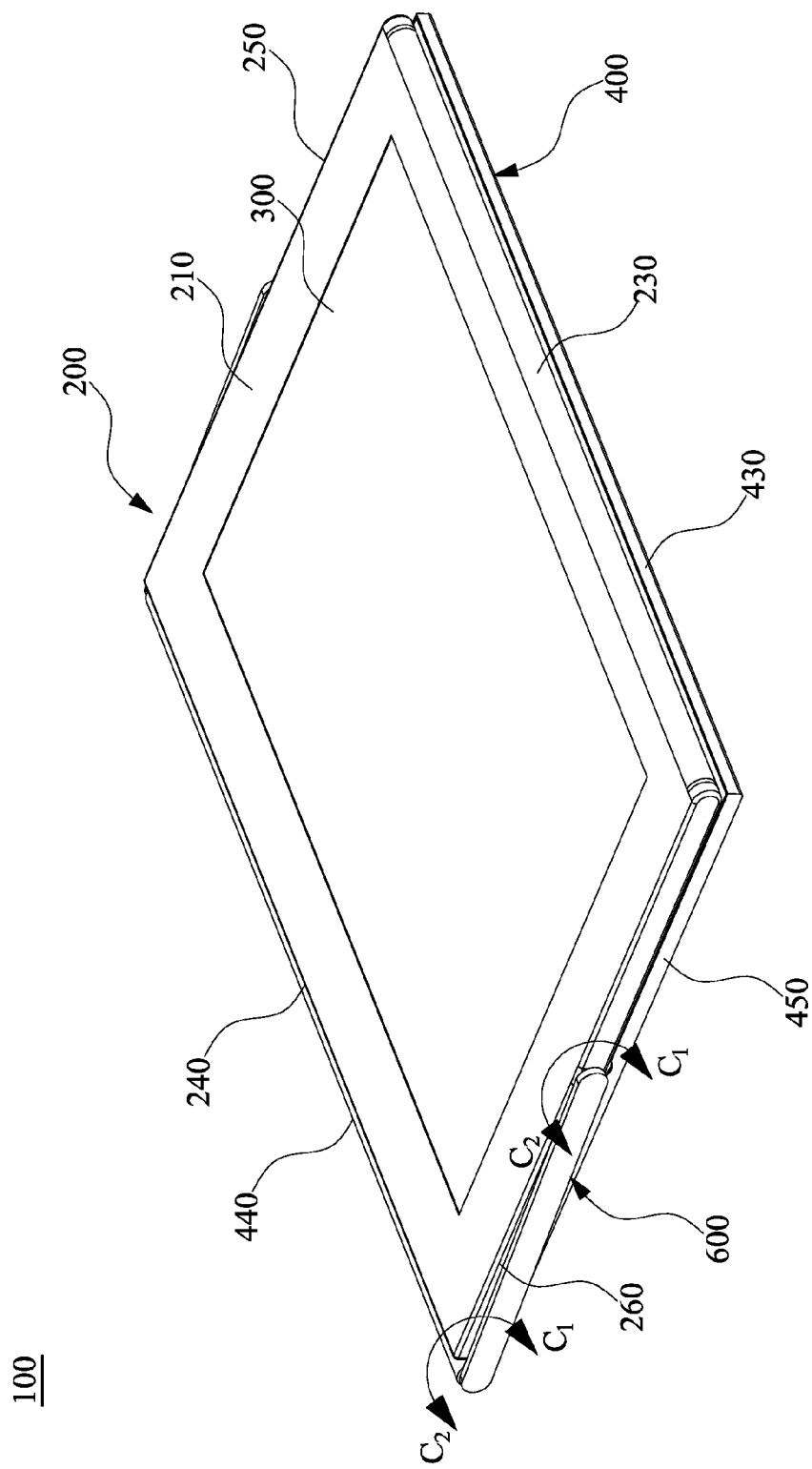
FIG. 2 is a schematic view showing the portable electronic device being in a first folding status according to the present disclosure.
Figure 3:
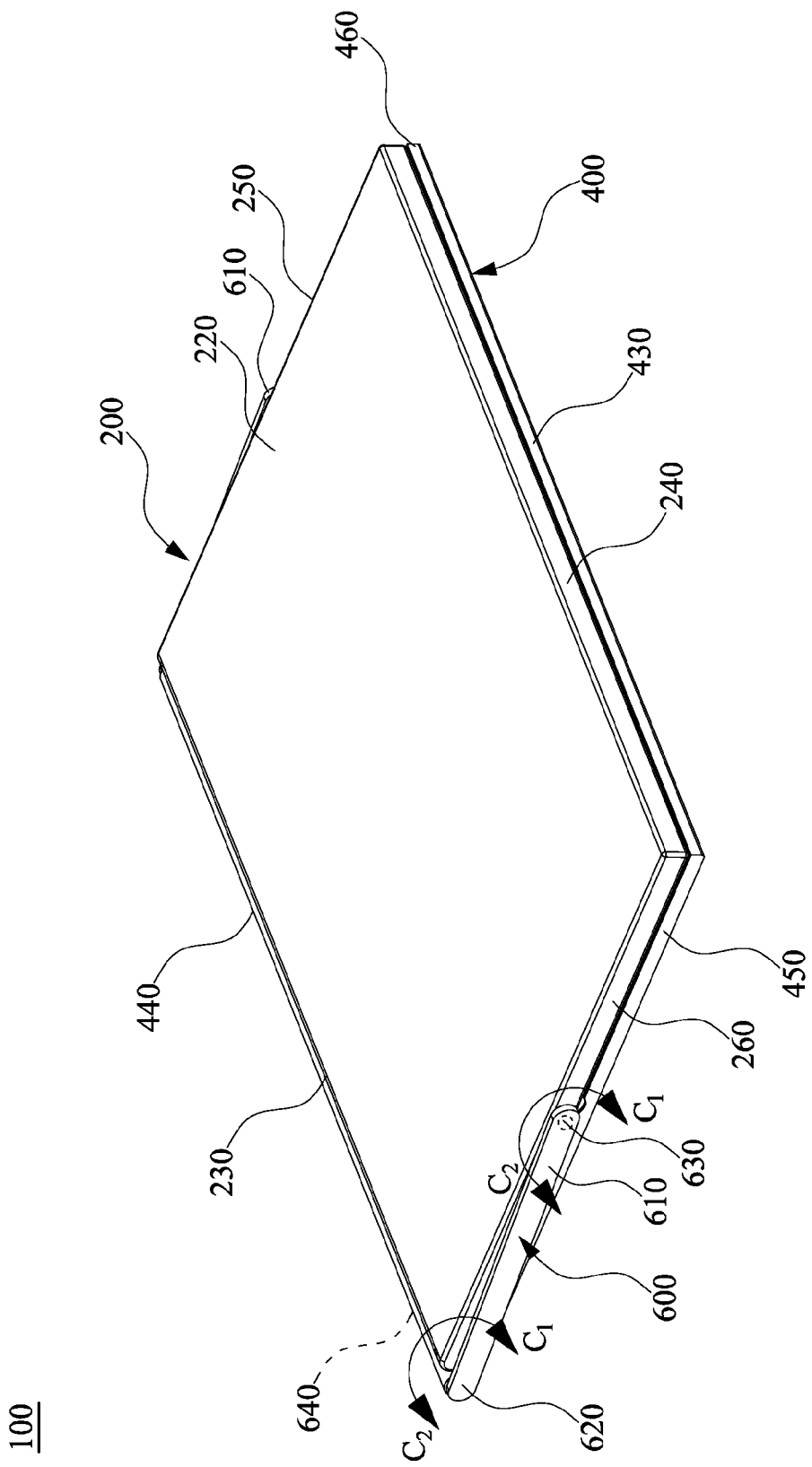
FIG. 3 is a schematic view showing the portable electronic device being in a second folding status according to the present disclosure.

Reference is now made to FIG. 1 to FIG. 3. FIG. 1 is a schematic view showing the portable electronic device 100 being in an unfolding status according to the present invention, FIG. 2 is a schematic view showing the portable electronic device 100 being in a first folding status according to the present invention, and FIG. 3 is a schematic view showing the portable electronic device 100 being in a second folding status according to the present invention.

As shown in FIG. 1 to FIG. 3, according to one embodiment of the present invention, the portable electronic device 100 includes a tablet PC 200, a base panel 400, two supports 600 and two connection members 700.

The tablet PC 200 is formed as, for example, a rectangular plate having an even thickness or a wedge-shaped plate having a gradually-increased thickness, and formed with a front surface 210 and a rear surface 220 opposite to the front surface 210, and four lateral surfaces surrounding the front surface 210 and the rear surface 220, the area of the front surface 210 and the area of the rear surface 220 are both larger than the area of one of the lateral surfaces, and the front surface 210 of the tablet PC 200 is installed with a touch screen 300. According to this embodiment, the lateral surfaces of the tablet PC 200 can be defined as a first long lateral surface 230 and a second long lateral surface 240 which are oppositely arranged with each other, and a first short lateral surface 250 and a second short lateral surface 260 which are also oppositely arranged with each other. The first short lateral surface 250 and the second short lateral surface 260 are arranged adjacently between the first long lateral surface 230 and the second long lateral surface 240.

The tablet PC 200 includes an external housing 201. The interior of the external housing 201 is installed with e.g., a mother board, a central process unit, a memory unit, a touch-input display panel (i.e., the mentioned touch screen 300), a hard disk, a battery unit and electronic components capable of enabling the PC to work, what shall be addressed is that the scope of the present invention is not limited to the disclosed arrangement.

The base panel 400 is formed as, for example, a rectangular plate having an even thickness or a wedge-shaped plate having a gradually-increased thickness, and formed with a front surface 410 and a rear surface 420 opposite to the front surface 410, and four lateral surfaces surrounding the front surface 410 and the rear surface 420, the area of the front surface 410 and the area of the rear surface 420 are both larger than the area of one of the lateral surfaces, and the front surface 410 of the base panel 410 is used for carrying the tablet PC 200, and at least includes an input interface 500 (e.g., a keyboard, touch screen, touch plate or drawing plate) and two guide slots 470. When the input interface 500 is a keyboard 510, comparing to the touch screen, the touch plate or the drawing plate being adopted as the input interface 500, the user can feel the feedback motion provided by keys installed on the keyboard 510 thereby increasing the input convenience.

According to this embodiment, the lateral surfaces of the base panel 400 can be defined as a third long lateral surface 430 and a fourth long lateral surface 440 which are oppositely arranged with each other, and a third short lateral surface 450 and a fourth short lateral surface 460 which are also oppositely arranged with each other. The third short lateral surface 450 and the fourth short lateral surface 460 are arranged adjacently between the third long lateral surface 430 and the fourth long lateral surface 440.

The input interface 500 (e.g., the keyboard 510) is disposed on the front surface 410 of the base panel 400 and close to the third long lateral surface 430. The two guide slots 470 are formed in linear shape, and respectively disposed on the front surface 410 of the base panel 400, and disposed at two opposite sides of the keyboard 510, extended from the third long lateral surface 430 to the fourth long lateral surface 440, and parallel to a long axial direction of the third short lateral surface 450 or a long axial direction of the fourth short lateral surface 460. According to this embodiment, each of the guide slots 470 includes a first distal end 471 and a second distal end 481 which are oppositely arranged with each other, the first distal end 471 is close to the third long lateral surface 430 of the base panel 440, the second distal end 472 is close to the fourth long lateral surface 440 of the base panel 400. In addition, the guide slot 470 is formed with a slot opening 473 which is narrower than the guide slot 470 and formed on the front surface 410 of the base panel 400.

Each of the supports 600, e.g., a connection rod, is provided with a first end 610 and a second end 620 which are oppositely arranged with each other. The first end 610 of each of the supports 600 is pivoted on the first short lateral surface 250 or the second short lateral surface 260 of the tablet PC 200. For example, the first end 610 of each of the supports 600 is pivoted at the center point defined on the first short lateral surface 250 or the second short lateral surface 260 of the tablet PC 200. The second end 620 of each of the supports 600 is pivoted at a distal end of the third short lateral surface 450 close to the fourth long lateral surface 440 of the base panel 400.

Furthermore, the first end 610 of each of the supports 600 is mutually pivoted with the first short lateral surface 250 or the second short lateral surface 260 of the tablet PC 200 through a first pivotal portion 630. Thus, through the first pivotal portion 630, the tablet PC 200 can be pivotally rotated relative to the first end 610 of the support 600.

Similarly, the second end 620 of each of the supports 600 is mutually pivoted with the third short lateral surface 450 or the fourth short lateral surface 460 of the base panel 400 through a second pivotal portion 640. Thus, through the second pivotal portion 640, the base panel 400 can be pivotally rotated relative to the second end 620 of the support 600.

Each of the connection members 700, e.g., a U-shaped ring, is formed with a third end and a fourth end which are oppositely arranged with each other. The fourth end is installed in the guide slot 470 and is limited to linearly slidably move in the guide slot 470, the third end is out of the guide slot 470 from the slot opening 473, and the third end is pivoted on the first short lateral surface 250 or the second short lateral surface 260 of the tablet PC 200. If each of the connection members 700 having the U shape is formed with an opening, the openings of the two connection members 700 are oriented opposite to each other.

Substantially, each of the connection members 700 includes a rod member 710, a top transversal shaft 720 and a bottom transversal shaft 730. The top transversal shaft 720 and the bottom transversal shaft 730 are respectively connected to two opposite ends of the rod member 710, which are the third end and the fourth end of the connection member 700, and protruded towards the same direction. The top transversal shafts 720 of the two connection members 700 are pivoted in the first long lateral surface 230 of the tablet PC 200, preferably, the top transversal shafts 720 are symmetrically pivoted in the first long lateral surface 230 of the tablet PC 200 thereby being enabled to rotate relative to the tablet PC 200. The bottom transversal shafts 730 of the two connection members 700 are limited in the two guide slots 470, thereby only being enabled to reciprocally slide in the guide slots 470 at two opposite sides of the second long lateral surface 240. The rod member 710 is protruded out of the guide slot 470 from the slot opening 473, and also capable of reciprocally sliding along the slot opening 473 of the guide slot 470 between two opposite sides of the second long lateral surface 240 of the base panel 400. Each of the connection members 700 can be formed in e.g., U shape or U-like shape, I shape or I-like shape, J shape or J-like shape, or Each of the connection members 700 can be made of a metal or plastic material, what shall be addressed is that the scope of the present invention is not limited to the disclosed arrangement.

As shown in FIG. 1 and FIG. 2, when a user slightly exerts external force to allow the supports 600 to rotate relative to the base panel 400 in a first clock direction C1, the tablet PC 200 to rotate relative to the supports 600 in a second clock direction C2, and the tablet PC 200 to drive the bottom transversal shaft 730 of each of the connection members 700 to slide to the first distal end 471 of the guide slot 470 towards a direction D2, the first short lateral surface 250 and the second short lateral surface 260 of the tablet PC 200 are respectively aligned with each of the supports 600, thereby allowing the tablet PC 200 to be stacked on the base panel 400, in other words, the rear surface 220 of the tablet PC 200 covers the front surface 410 of the base panel 400, so the touch screen 300 can be exposed on the front surface 210 of the tablet PC 200. This status is defined as a first folding status (as shown in FIG. 2).

Reference is now made to FIG. 1 and FIG. 3. FIG. 3 is a schematic view showing the portable electronic device 100 being in a second folding status according to the present invention.

As shown in FIG. 1, when a user slightly exerts external force to allow the supports 600 to rotate relative to the base panel 400 in the second clock direction C2, the tablet PC 200 to rotate relative to the supports 600 in the first clock direction C1, and the tablet PC 200 drives the bottom transversal shaft 730 of each of the connection members 700 to slide to the second distal end 472 of the guide slot 470 towards a direction D1, the first short lateral surface 250 and the second short lateral surface 260 of the tablet PC 200 are respectively aligned with each of the supports 600, thereby allowing the tablet PC 200 to be stacked on the base panel 400, in other words the front surface 210 of the tablet PC 200 covers the front surface 410 of the base panel 400, so the touch screen 300 can be hidden. This status is defined as a second folding status (as shown in FIG. 3).

As shown in FIG. 1, the base panel 400 further includes a position-limiting recess 480. The position-limiting recess 480 is transversally formed on the front surface 410 of the base panel 400, and disposed on the side of the input interface 500 (e.g., the keyboard 510) which is away from the third long lateral surface 430 of the base panel 400, and disposed between the input interface 500 (e.g., the keyboard 510) and the fourth long lateral surface 440 of the base panel 400, parallel to the long axial direction of the fourth long lateral surface 440 of the base panel 400, in other words the input interface 500 is disposed between the third long lateral surface 430 of the base panel 400 and the position-limiting recess 480.

Accordingly, as shown in FIG. 1, when a user slightly exerts external force to allow the supports 600 to rotate relative to the base panel 400 in the second clock direction C2, the tablet PC 200 to rotate relative to the supports 600 in the first clock direction C1, and the first long lateral surface 230 of the tablet PC 200 is moved towards the direction D1 for being in the position-limiting recess 480, so the first long lateral surface 230 of the tablet PC 200 is not able to easily slide towards the fourth long lateral surface 440 of the base panel 400. At this moment, the first long lateral surface 230 of the tablet PC 200 is located between the first distal end 471 and the second distal end 472 of the guide slot 470, so the tablet PC 200 can stand on the front surface 410 of the base panel 400, thereby forming an included angle θ between the support 600 and the front surface 410 of the base panel 400, the user can therefore input texts or commands through the input interface 500, this status is defined as an unfolding status.

Moreover, when the base panel 400 is formed with plural position-limiting recesses 480, the plural position-limiting recesses 480 are disposed in parallel between the keyboard 510 and the fourth long lateral surface 440 of the base panel 400, and parallel to a long axial direction of the fourth long lateral surface 440 of the base panel 400, so the design personnel can arrange the plural position-limiting recesses 480 at proper locations with respect to the elevation angle desired by the user.

Figure 4A:
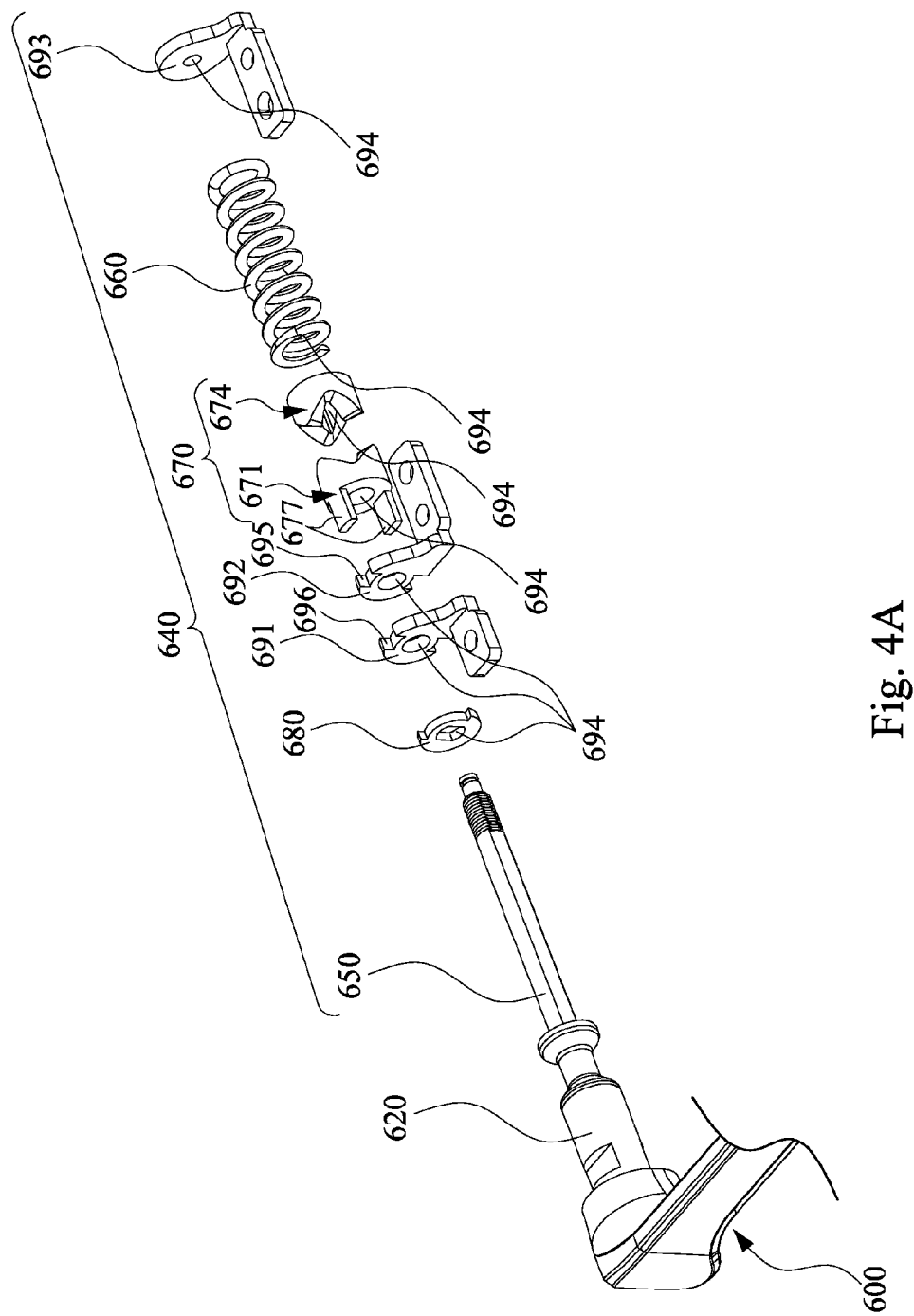
FIG. 4A is an exploded view showing the second pivotal portion of the portable electronic device according to the present disclosure.
Figure 4B:
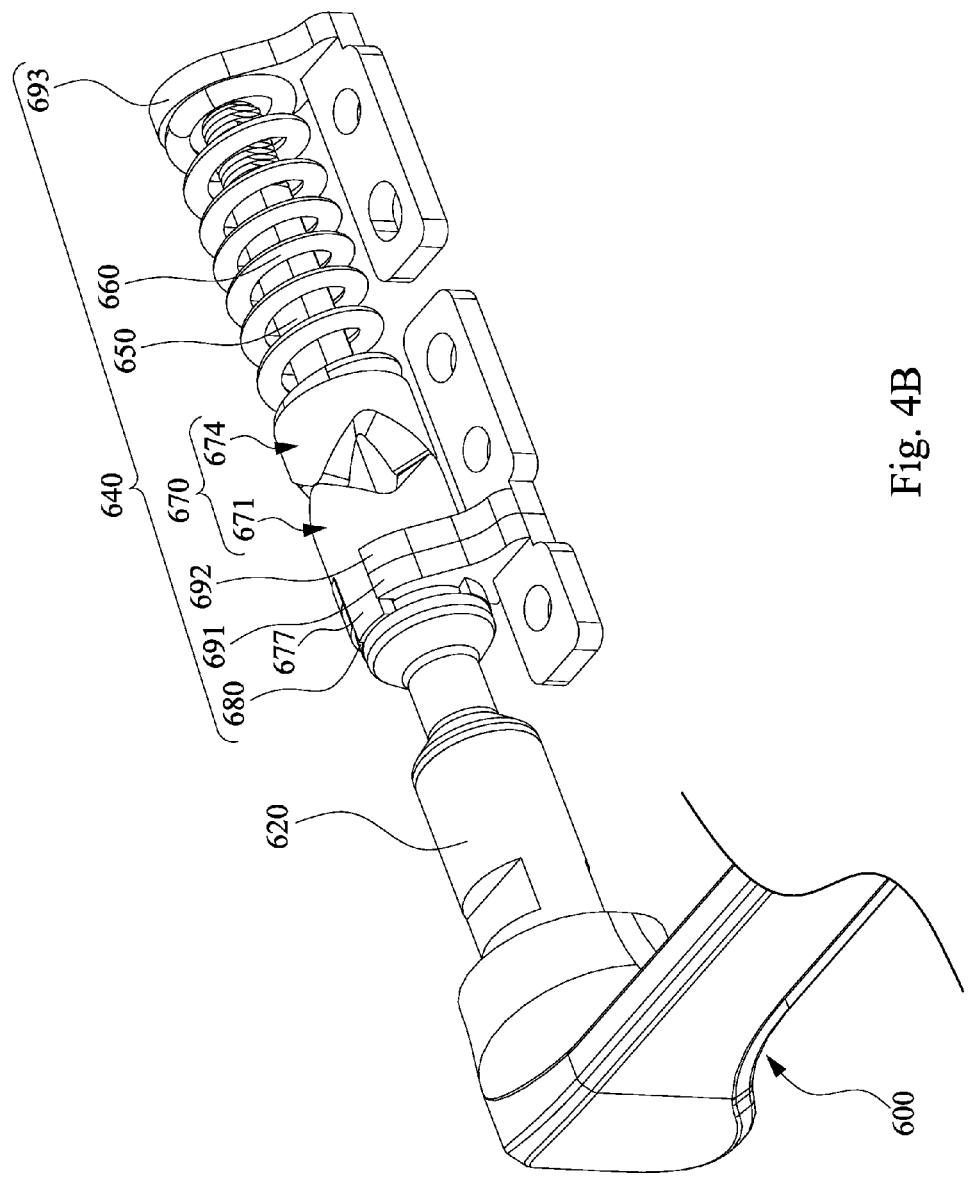
FIG. 4B is a schematic view showing the assembly of the second pivotal portion shown in FIG. 4A being in the unfolding status.
Figure 4C:
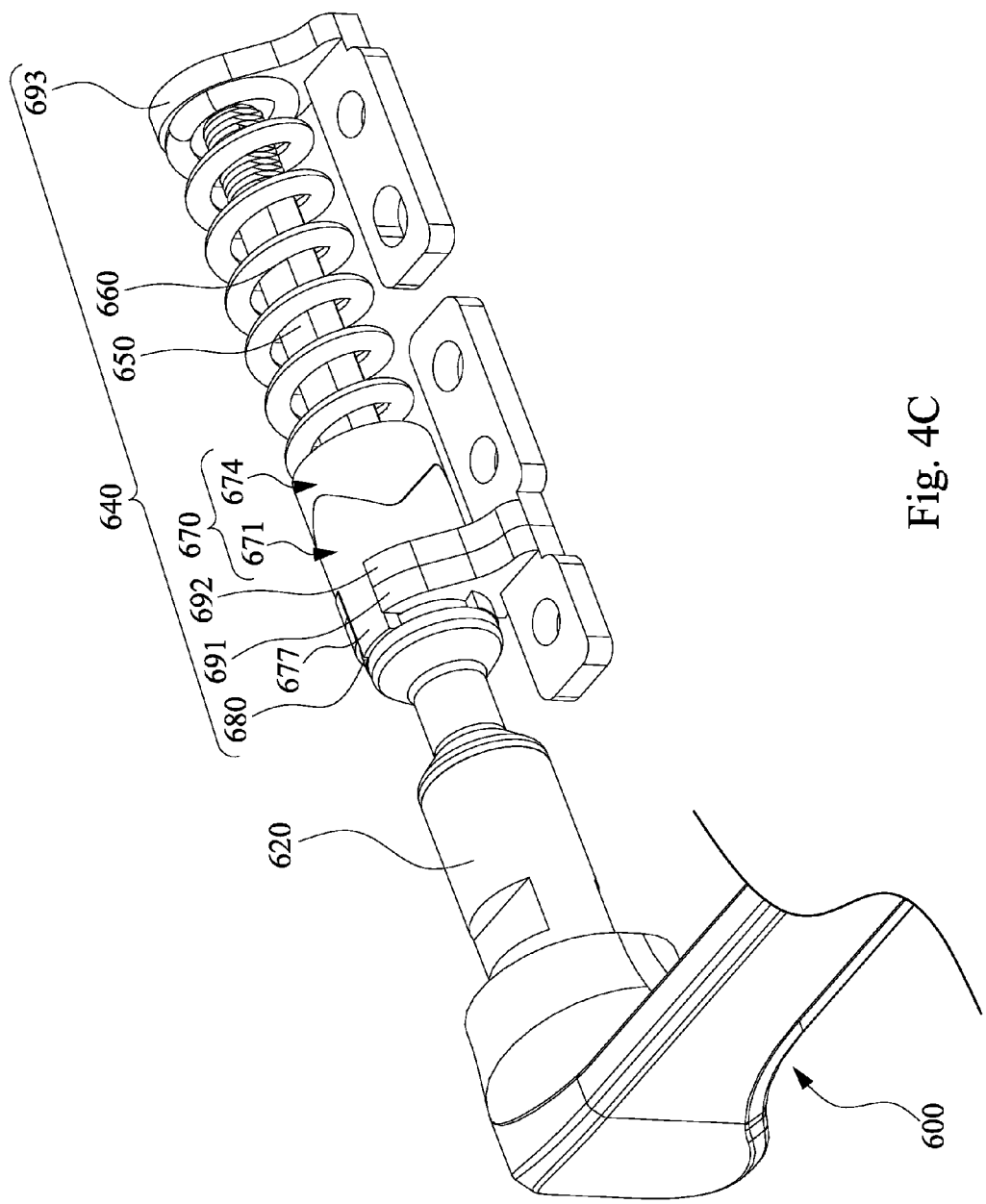
FIG. 4C is a schematic view showing the assembly of the second pivotal portion shown in FIG. 4A being in the folding status.

Reference is now made to FIG. 4A to FIG. 4C. FIG. 4A is an exploded view showing the second pivotal portion 640 of the portable electronic device 100 according to the present invention. FIG. 4B is a schematic view showing the assembly of the second pivotal portion 640 shown in FIG. 4A being in the unfolding status. FIG. 4C is a schematic view showing the assembly of the second pivotal portion 640 shown in FIG. 4A being in the folding status.

As shown in FIG. 4A, each of the second pivotal portions 640 includes a shaft rod 650, a retractable spring 660, a cam set 670, an angle restraining safety ring 680, a first fasten rack 691, a second fasten rack 692 and a third fasten rack 693. One end of the shaft rod 650 is connected to the second end 620 of the support 600, and formed with a shaft core at the second end 620 of the support 600.

Figure 5B:
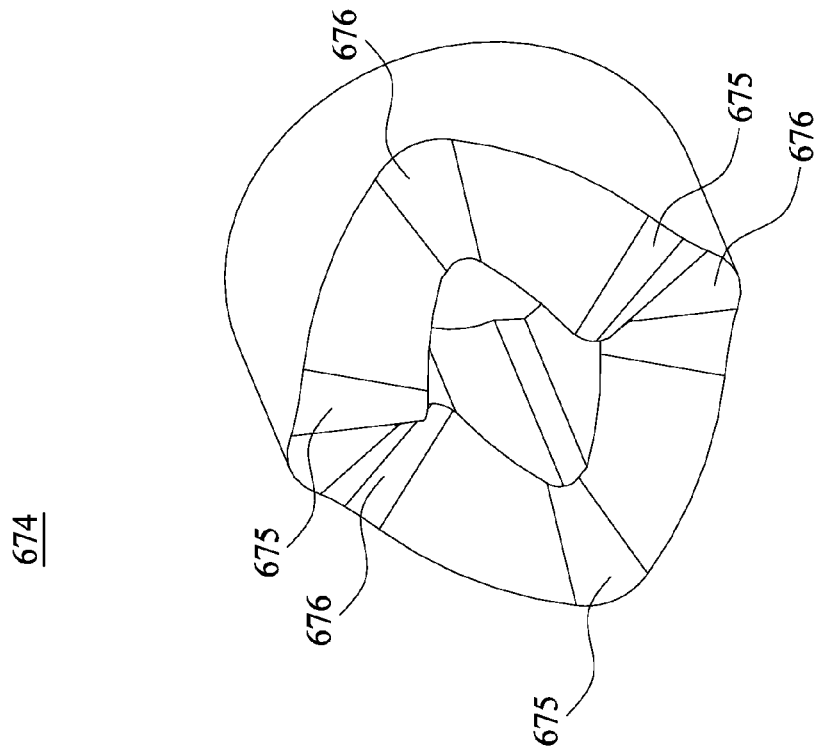
FIG. 5B is a schematic view showing the three-peak rotary cam shown in FIG. 4A.
Figure 5A:
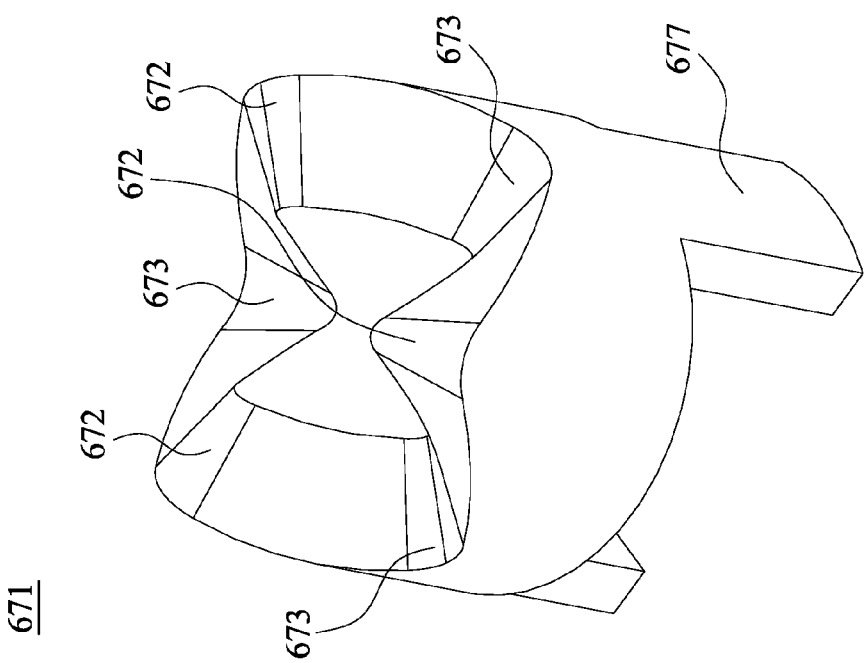
FIG. 5A is a schematic view showing the three-peak fixed cam shown in FIG. 4A.

Reference is now made to FIG. 5A and FIG. 5B. FIG. 5A is a schematic view showing the three-peak fixed cam 671 shown in FIG. 4A, and FIG. 5B is a schematic view showing the three-peak rotary cam 674 shown in FIG. 4A.

The cam set 670 includes a three-peak fixed cam 671 and a three-peak rotary cam 674. The three-peak fixed cam 671 is matched with the three-peak rotary cam 674. As shown in FIG. 5A, one end of the three-peak fixed cam 671 is formed with three first peaks 672 spaced with equal intervals, thus, three first caves 673 are respectively formed among the first peaks 672 in which each first cave 673 is formed between any two of the first peaks 672. The other end of the three-peak fixed cam 671 thereof is formed with two fixed ribs 677. As shown in FIG. 5B, the three-peak rotary cam 674 is formed with three second peaks 675 spaced with equal intervals, thus, three second caves 676 are respectively formed among the second peaks 675 in which each second cave 676 is formed between any two of the second peaks 675.

As shown in FIG. 4B, the first fasten rack 691, the second fasten rack 692 and the third fasten rack 693 are all fixed on the base panel 400. The first fasten rack 691 and the second fasten rack 692 are adjacently disposed and in contact with each other, the three-peak fixed cam 671, the three-peak rotary cam 674 and the retractable spring 660 are in sequence disposed between the second fasten rack 692 and the third fasten rack 693.

When being assembled, the shaft rod 650 in sequence passes axial core openings 694 respectively formed in the angle restraining safety ring 680, the first fasten rack 691, the second fasten rack 692, the three-peak fixed cam 671, the three-peak rotary cam 674, the retractable spring 660 and the third fasten rack 693, at this moment, by inserting the fasten rib 677 into coaxial recessed slots 695, 696 (shown in FIG. 4A) of the first fasten rack 691 and the second fasten rack 692, the three-peak fixed cam 671 is enabled to be fastened on the first fasten rack 691 and the second fasten rack 692, and the angle restraining safety ring 680 is fastened on the first fasten rack 691, and two ends of the three-peak rotary cam 674 are respectively abutted against the three-peak fixed cam 671 and the retractable spring 660.

Accordingly, as shown in FIG. 4B, when the tablet PC 200 is stacked on the base panel 400, the second peaks 675 of the three-peak rotary cam 674 are respectively in point contact with the first peaks 672 of the three-peak fixed cam 671 one to one, the second peaks 675 of the three-peak rotary cam 674 are respectively abutted against the first peaks 672 of the three-peak fixed cam 671 thereby compressing the retractable spring 660, so the retractable spring 660 can store recovering elastic force for allowing the second peaks 675 of the three-peak rotary cam 674 to continuously press the first peaks 672 of the three-peak fixed cam 671.

As shown in FIG. 1 and FIG. 4C, when the user wants the portable electronic device 100 to enter the unfolding status, the user only has to slightly exert external force to allow the supports 600 to slightly rotate relative to the base panel 400 in the second clock direction C2, at this moment, the supports 600 drive the shaft rod 650, the angle restraining safety ring 680 and the three-peak rotary cam 674 to rotate correspondingly. Because of the recovering elastic force provided by the retractable spring 660, the second peaks 675 of the three-peak rotary cam 674 are respectively received and abutted against the first caves 673 of the three-peak fixed cam 671, at this moment, the first caves 673 can fully accommodate the second peaks 675, the second caves 676 can fully accommodate the first peaks 672. Thus, the supports 600 can automatically drive the tablet PC 200 to raise on the base panel 400 and to substantially reach the location of the position-limiting recess 480, so the angle of the tablet PC 200 does not require to be manually adjusted, in other words the tablet PC 200 of the portable electronic device 100 can raise semi-automatically. The angle restraining safety ring 680 is served to restrain the rotating angle of the shaft rod 650.

Because the three-peak fixed cam 671 and the three-peak rotary cam 674 are respectively formed with the three peaks 672, 675 and the three caves 673, 676, when each of the peaks 675 of the three-peak rotary cam 674 enters the corresponding cave 673 from each of the peaks 672 of the three-peak fixed cam 671, the three-peak rotary cam 674 only needs to be rotated about 50 to 60 degrees or e.g., 54.5 degrees. As such, only rotating the supports 600 for about 50 to 60 degrees (i.e., the mentioned included angle) can enable the tablet PC 200 to stand on the base panel 400, so the action angle is prevented from being overly large, the raising motion of the tablet PC 200 can be kept to be smooth, and the location where the tablet PC 200 standing on the base panel 400 can be ensured.

Comparing to the design of dual-peak cam, when each peak of a dual-peak rotary cam is received in a cave of a dual-peak fixed cam from each peak of the dual-peak fixed cam, the dual-peak rotary cam has to be rotated 90 degrees, if the dual-peak rotary cam and the dual-peak fixed cam are adopted for composing the cam set, a disadvantage of having overly large action angle of the supports and the tablet PC would be caused.

Figure 6:
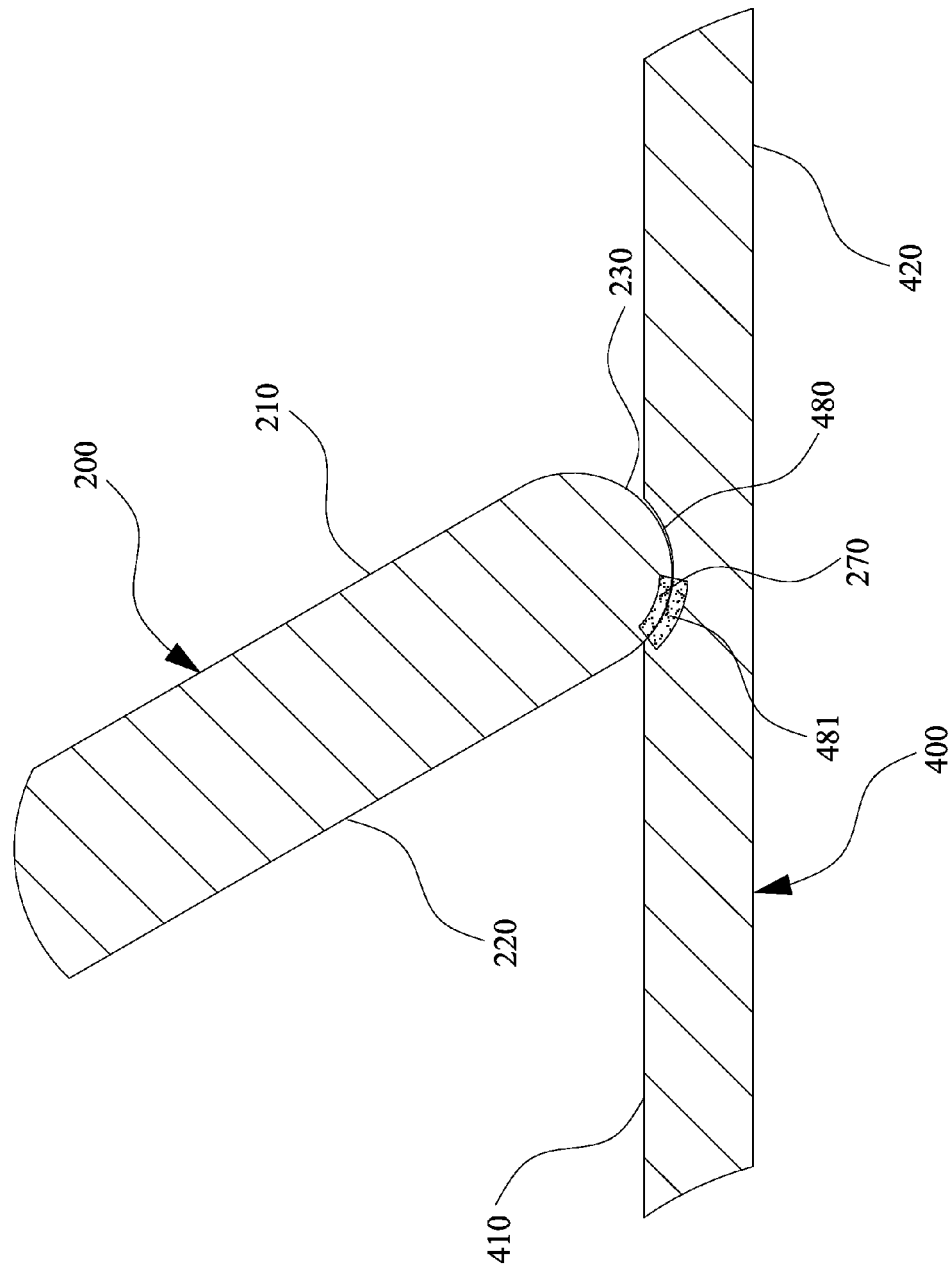
FIG. 6 is a partial cross sectional view showing the portable electronic device being in the unfolding status according to one embodiment of the present disclosure.

FIG. 6 is a partial cross sectional view showing the portable electronic device 100 being in the unfolding status according to one embodiment of the present invention. As shown in FIG. 1 and FIG. 6, the tablet PC 200 further includes one or plural first magnetic members 270. The magnetic member 270 is disposed on the rear surface 220 of the tablet PC 200 and close to the first long lateral surface 230, or disposed on the first long lateral surface 230 of the tablet PC 200. Substantially, the first magnetic member 270 can be disposed inside the tablet PC 200 and close to the first long lateral surface 230. The base panel 400 includes one or plural second magnetic members 481. The second magnetic member 481 is disposed in the position-limiting recess 480 and corresponding to the location of the first magnetic member 270. Substantially, the second magnetic member 481 can be disposed inside the base panel 400 and close to the inner wall of the position-limiting recess 480.

Thus, when the portable electronic device 100 enters the unfolding status from the first or the second folding status, the first long lateral surface 230 of the tablet PC 200 is moved for being received in the position-limiting recess 480 of the base panel 400, the tablet PC 200 is enabled to be positioned in the position-limiting recess 480 through the first magnetic member 270 mutually attracting the second magnetic member 481, thereby allowing the tablet PC 200 to more stably stand on the front surface 410 of the base panel 400.

What shall be addressed is that the quantity of the first magnetic member 270 and the quantity of the second magnetic member 481 are the same; the first magnetic member 270 and the second magnetic member 481 can be a combination of metal and magnet; or the above two are both magnets. The magnet includes an electromagnet capable of being switched off its magnetic force for allowing the portable electronic device to easily enter the second folding status from the unfolding status.

Figure 7:
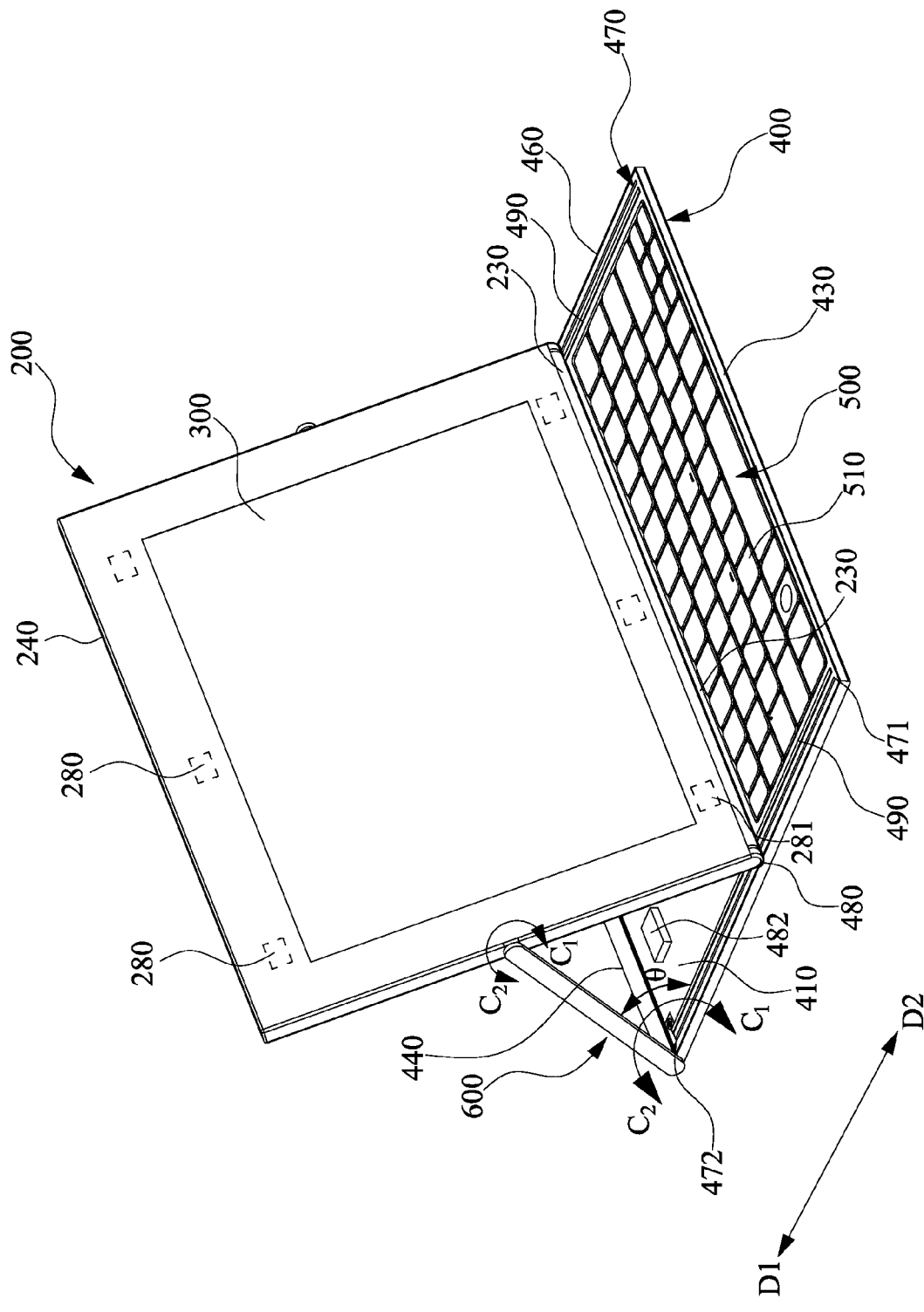
FIG. 7 is a schematic view showing the portable electronic device being in the unfolding status according to one embodiment of the present disclosure.

In addition, as shown in FIG. 1 and FIG. 7, the base panel 400 further includes two protruding bars 490. The two protruding bars 490 are oppositely arranged on the front surface 410 of the base panel 400. Each of the protruding bars 490 is formed in a straight status and disposed at two opposite sides of the input interface 500 (e.g., the keyboard 510), extended from the third long lateral surface 430 to the fourth long lateral surface 440, and parallel to the long axial direction of the third short lateral surface 450 or that of the fourth short lateral surface 460.

When the portable electronic device 100 enters the unfolding status from the first or the second folding status, the tablet PC 200 can slide on the front surface 410 of the base panel 400, so the first long lateral surface 230 of the tablet PC 200 is in physical contact with the two protruding bars 490 and to slide on the two protruding bars 490, because the heights of the two protruding bars 490 protruding from the front surface 410 of the base panel 400 is higher than the height of the input interface 500 (e.g., the keyboard 510) protruding from the front surface 410 of the base panel 400, a gap is kept between the first long lateral surface 230 of the tablet PC 200 and the input interface 500 (e.g., the keyboard 510), thereby protecting the surface of the input interface 500 (e.g., the keyboard 510) from being damaged due to the slide motion.

As shown in FIG. 1 and FIG. 7, the tablet PC 200 further includes one or plural third magnetic members 280 and one or plural fifth magnetic members 281. The third magnetic member 280 is disposed on the first long lateral surface 230 of the tablet PC 200. The fifth magnetic member 281 is disposed on the second long lateral surface 240 of the tablet PC 200. For example, the third magnetic member 280 can be disposed inside the tablet PC 200 and close to the first long lateral surface 230 or exposed on the surface of the tablet PC 200. The fifth magnetic member 281 can be disposed inside the tablet PC 200 and close to the second long lateral surface 240 or exposed on the surface of the tablet PC 200.

The base panel 400 further includes one or plural fourth magnetic members 482. The fourth magnetic member 482 is disposed on the third long lateral surface 430 or the fourth long lateral surface 440 of the base panel 400 or both of the above. For example, the fourth magnetic member 482 can be disposed inside the base panel 400 and close to the third long lateral surface 430 or the fourth long lateral surface 400 or both of the above, or exposed on the surface of the base panel 400.

When the tablet PC 200 is stacked on the base panel 400 (the first folding status shown in FIG. 2 or the second folding status shown in FIG. 3), because the third magnetic member 280 (or the fifth magnetic member 281) and the fourth magnetic member 482 are mutually aligned, the tablet PC 200 can be firmly positioned on the base panel 400 (as shown in FIG. 2 or FIG. 3) through the third magnetic member 280 (or the fifth magnetic member 281) mutually attracting the fourth magnetic member 482, and the retractable spring 660 is temporally unable to allow the second peaks 675 of the three-peak rotary cam 674 to be received in the first caves 673 of the three-peak fixed cam 671.

What shall be addressed is that the quantity of the third magnetic member 280 (or the fifth magnetic member 281) and the quantity of the fourth magnetic member 482 are the same; the third magnetic member 280 (or the fifth magnetic member 281) and the fourth magnetic member 482 can be a combination of metal and magnet; or the above two are both magnets. The magnet includes an electromagnet capable of being switched off its magnetic force for allowing the portable electronic device to easily enter the unfolding status from the first or the second folding status.

FIG. 8 is a partial cross sectional view showing the portable electronic device 100 being in the unfolding status according to another embodiment of the present invention.

As shown in FIG. 1 and FIG. 8, the tablet PC 200 further includes a first electric connector 290 (e.g., a pogo pin or a USB connector), the first electric connector 290 is disposed on the rear surface 220 of the tablet PC 200 and close to the first long lateral surface 230, or disposed on the first long lateral surface 230 of the tablet PC 200. The base panel 400 further includes a second electric connector 483 (e.g., a pogo pin or a USB connector), the second electric connector 483 is disposed on the inner wall of the position-limiting recess 480 (as shown in figures) or on the top edge.

When the portable electronic device 100 enters the unfolding status from the first or the second folding status, the first long lateral surface 230 of the tablet PC 200 is moved into the position-limiting recess 480 of the base panel 400, in other words the tablet PC 200 can stand on the base panel 400, the first electric connector 290 connects to the second electric connector 483 thereby allowing signals to be transferred between the tablet PC 200 and the input interface 500 (e.g., the keyboard 510) of the base panel 400.

However, the present invention is not limited to the disclosed arrangement, a signal cable (not shown in figures) of the base panel 400 can be connected to the tablet PC 200 through one of the supports 600, or the tablet PC 200 and the input interface 500 (e.g., the keyboard 510) of the base panel 400 can be electrically connected with a wireless means (e.g., Bluetooth protocols).

Figure 9A:
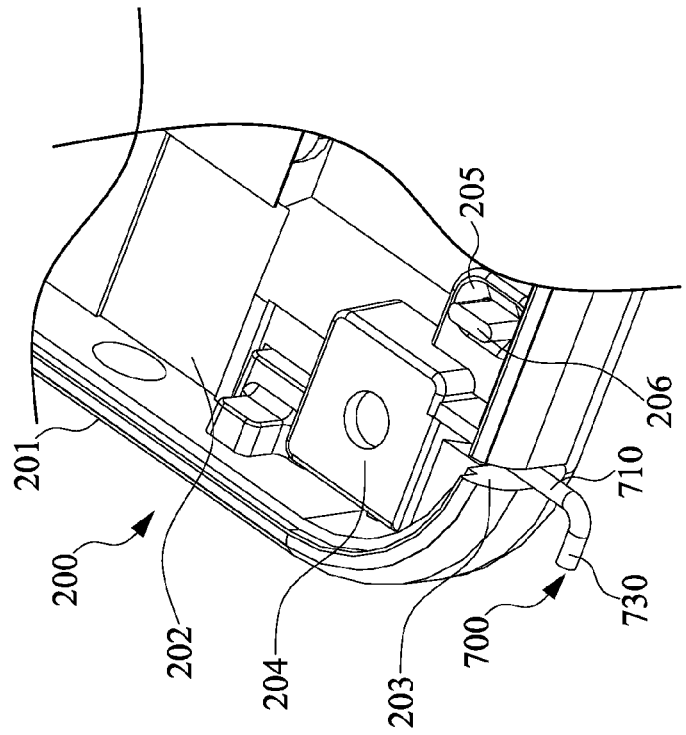
FIG. 9A is a partial cross sectional view showing the tablet PC of the portable electronic device according to one another embodiment of the present disclosure.
Figure 9B:
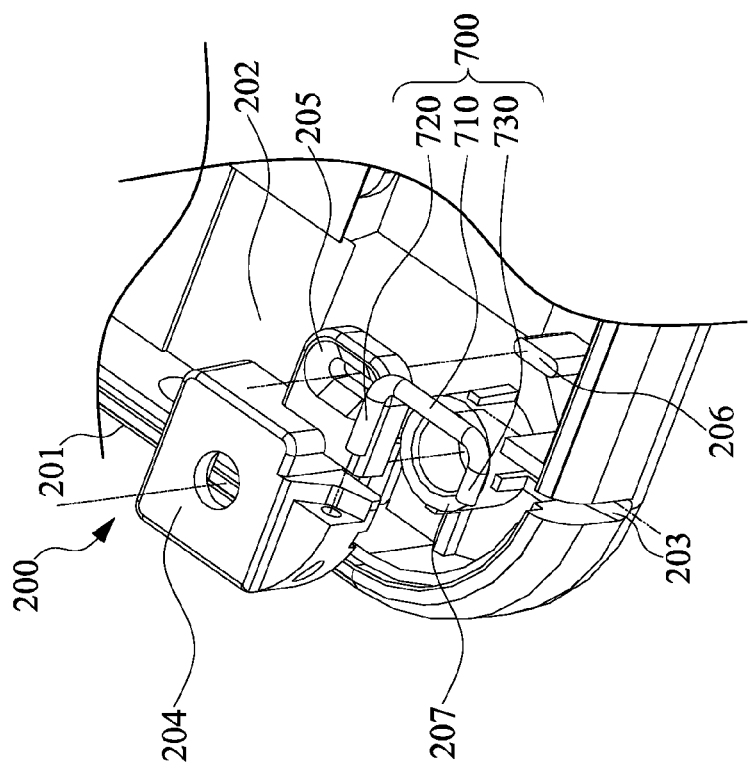
FIG. 9B is a schematic view showing the assembly of FIG. 9A.

Reference is now made to FIG. 9A and FIG. 9B. FIG. 9A is a partial cross sectional view showing the tablet PC 200 of the portable electronic device 100 according to one another embodiment of the present invention, and FIG. 9B is a schematic view showing the assembly of FIG. 9A.

As shown in FIG. 9A and FIG. 9B, the external housing 201 of the tablet PC 200 is formed with an accommodation space 202 and a slit 203 which is in communication with the accommodation space 202. The accommodation space 202 can accommodate the mentioned motherboard, the central process unit, the memory unit, the touch screen, the hard disk, the battery unit and the electronic components capable of enabling the PC to work. The tablet PC 200 further includes a fix housing 204. The fix housing 204 is fixed in the accommodation space 202. The top transversal shaft 720 of the connection member 700 is pivoted on the fix housing 204, and the rod member 710 of the connection member 700 is protruded out of the external housing 201 through the slit 203.

One side of the fix housing 204 is further formed with a fix part 205. When the top transversal shaft 720 of the connection member 700 is inserted in one side of the fix housing 204, the connection member 700 is inserted on a convex column 207 formed inside the external housing 201, and the fix part 205 is fixed on a thermal melting column 206 formed inside the external housing 201 through a thermal melting means, thereby fixing the fix housing 204 in the accommodation space 202. After the accommodation space 202 and the slit 203 are covered, the connection member 700 is enabled to be restrained in the external housing 201 and capable of pivotally rotating.

Referring to FIG. 10A, which is a schematic view showing the operation of the front surface 410 of the base panel 400, the top inner surface 474 of the guide slot 470 and the connection member 700 of the portable electronic device 100 according to a first embodiment of the present invention.

As shown in FIG. 10A, a vertical differentiation M1 is formed between a lowest point P1 defined on the inner surface of the position-limiting recess 480 and the front surface 410 of the base panel 400. A vertical differentiation M2 is formed between a lowest point P2 defined on a top inner surface 474 of the guide slot 470 being in contact with the bottom transversal shaft 730 and corresponding to the lowest point P1 defined on the inner surface of the position-limiting recess 480 and the highest point defined on the top inner surface 474 of the guide slot 470 being in contact with the bottom transversal shaft 730 and not corresponding to the lowest point P1 on the inner surface of the position-limiting recess 480. The vertical differentiation M1 and the vertical differentiation M2 are substantially the same, for example, as shown in FIG. 10A, a gap G1, e.g., 1.1 mm, is formed between the lowest point P1 in the position-limiting recess 480 and the lowest point P2 in the guide slot 470. However, as shown in FIG. 7, when the tablet PC 200 is required to continuously slide towards the fourth long lateral surface 440 of the base panel 400, under the design of having the shortest distance, the bottom transversal shaft 730 of the connection member 700 is unable to pass the lowest point P2 in the guide slot 470, thereby causing the tablet PC 200 being unable to smoothly slide to the fourth long lateral surface 440 of the base panel 400 for allowing the portable electronic device 100 to enter the second folding status.

Referring to FIG. 10B, which is a schematic view showing the operation of the front surface 410 of the base panel 400, the top inner surface 474 of the guide slot 470 and the connection member 700 of the portable electronic device 100 according to a second embodiment of the present invention.

As shown in FIG. 10B, wherein FIG. 10 B is an improvement regarding to FIG. 10A, a gap G2 defined between a lowest point P3 in the position-limiting recess 480 and a lowest point P4 in the guide slot 470 is shortened from 1.1 mm to 0.58 mm, so the top inner surface 474 of the guide slot 470 being in contact with the bottom transversal shaft 730 is enabled to have the curvature thereof being gradually smoothened corresponding to the surface curvature of the position-limiting recess 480. Accordingly, as shown in FIG. 7, when the tablet PC 200 is required to continuously slide towards the fourth long lateral surface 440 of the base panel 400, under the design of having the shortest distance, the bottom transversal shaft 730 of the connection member 700 is able to smoothly pass the lowest point P4 in the guide slot 470, thereby enabling the tablet PC 200 to smoothly slide to the fourth long lateral surface 440 of the base panel 400 for allowing the portable electronic device 100 to enter the second folding status.

In other words, a vertical differentiation M3 is formed between the lowest point P3 defined on the inner surface of the position-limiting recess 480 and the front surface 410 of the base panel 400. A vertical differentiation M4 is formed between the lowest point P4 defined on the top inner surface 474 of the guide slot 470 being in contact with the bottom transversal shaft 730 and corresponding to the lowest point P3 defined on the inner surface of the position-limiting recess 480 and the highest point defined on the top inner surface 474 of the guide slot 470 being in contact with the bottom transversal shaft 730 and not corresponding to the lowest point P1 on the inner surface of the position-limiting recess 480. The vertical differentiation M3 is larger than the vertical differentiation M4. Accordingly, the curvature of the top inner surface 474 of the guide slot 470 being in contact with the bottom transversal shaft 730 and corresponding to the surface curvature of the position-limiting recess 480 is less obvious than the inner surface curvature of the position-limiting recess 480.

In addition, the gap defined between the top inner surface 474 of the guide slot 470 being in contact with the bottom transversal shaft 730 of the connection member 700 and the front surface 410 of the base panel 400 becomes smallest at the gap G2 defined between the lowest point P3 in the position-limiting recess 480 and the lowest point P4 in the guide slot 470. Moreover, two sides of the lowest point P4 in the guide slot 470 are further formed with an arc guiding angle R1 (e.g., R31.0 mm) and R2 (e.g., R14.5 mm), so the top inner surface 474 of the guide slot 470 is smoother corresponding to the lowest point P4 of the guide slot 470, so under the design of having the shortest distance, the bottom transversal shaft 730 of the connection member 700 is able to smoothly pass the bottleneck point of the lowest point P4 in the guide slot 470.

According to what has been disclosed above, when the tablet PC is stacked on the base panel, the portable electronic device provided by the present invention allows the user to slightly pull the tablet PC and the base panel, then the retractable spring is enabled to allow the second peaks to be respectively received and abutted against the first caves, so the supports are able to drive the tablet PC to be automatically raised so as to stand on the base panel, thereby providing convenience for operating the portable electronic device and increasing the willingness for the user to purchase and use the portable electronic device.

Moreover, because the three-peak fixed cam and the three-peak rotary cam are respectively formed with the three peaks and the three caves, when each of the peaks of the three-peak rotary cam is received in the corresponding cave from each of the peaks of the three-peak fixed cam, the three-peak rotary cam only needs to be rotated about 50 to 60 degrees. As such, only rotating the supports for about 50 to 60 degrees can allow the tablet PC to stand on the base panel, so the action angle is prevented from being overly large, the raising motion of the tablet PC can be kept to be smooth, and the location where the tablet PC standing on the base panel can be ensured.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A portable electronic device, comprising:
    a tablet PC comprising a touch screen;
    a base panel;
    two supports, each of the supports comprises a first end and a second end which are oppositely arranged with each other;
    two first pivotal portions in which the first ends are respectively pivoted on two opposite lateral surfaces of the tablet PC through the first pivotal portions;
    two second pivotal portions in which the second ends are respectively pivoted on two opposite lateral surfaces of the base panel through the second pivotal portions, and each of the second pivotal portions comprises:
        a shaft rod having one end thereof fastened on the second end of one of the supports;
        a retractable spring sleeved on the shaft rod;
        a three-peak fixed cam sleeved on the shaft rod, fastened on the base panel, wherein the three-peak fixed cam comprises three first peaks spaced with equal intervals, and a first cave is formed between every two of the first peaks; and
a three-peak rotary cam sleeved on the shaft rod, rotated along the supports, and two ends of the three-peak rotary cam being respectively abutted against the three-peak fixed cam and the retractable spring, wherein the three-peak rotary cam comprises three second peaks spaced with equal intervals, and a second cave is formed between every two of the second peaks,
wherein when the tablet PC is stacked on the base panel, the second peaks respectively abuts against the first peaks to compress the retractable spring,
when the retractable spring pushes the second peaks to be respectively received into and abutted against the first caves, the tablet PC stands on the base panel, and an included angle being in a range of 50 to 60 degrees is formed between the base panel and each of the supports.

2. The portable electronic device according to claim 1, wherein the base panel comprises:
two guide slots oppositely formed on one surface of the base panel, each of the guide slots is formed with a slot opening which is narrower than the guide slot.

3. The portable electronic device according to claim 2, further comprising:
two connection members, each of the connection members comprising a third end and a fourth end which are oppositely arranged with each other,
wherein the third ends thereof are respectively protruded out from one of the slot openings to respectively pivot with the tablet PC, the fourth ends thereof are respectively slidably disposed in the guide slots.

4. The portable electronic device according to claim 3, wherein each of the connection members is formed in a U shape, and each of the connection members comprises:
a rod member disposed in the slot opening of the guide slot;
a top transversal shaft disposed at one end of the rod member, disposed outside the slot opening, extended towards one direction, and pivoted at one side of the tablet PC; and
a bottom transversal shaft disposed at the other end of the rod member, extended towards the same direction to which the top transversal shaft being extended, limited in the guide slot for reciprocally sliding between two opposite distal ends of the guide slot.

5. The portable electronic device according to claim 4, wherein the tablet PC comprises:
an external housing formed with an accommodation space and a slit communicated with the accommodation space, wherein the touch screen is received in the accommodation space; and
a fix housing fixed in the accommodation space, wherein the top transversal shaft is pivoted on the fix housing, the rod member is protruded outwards from the slit.

6. The portable electronic device according to claim 3, wherein the base panel further comprises:
two protruding bars oppositely disposed on the surface of the base panel; and
an input interface configured on the surface of the base panel and arranged between the guide slots,
wherein when the tablet PC stands on the base panel, one side of the tablet PC is in physical contact with the two protruding bars such that a gap between the tablet PC and the input interface is formed.

7. The portable electronic device according to claim 6, wherein the input interface is a keyboard, a touch screen, a touch plate or a drawing plate.

8. The portable electronic device according to claim 3, wherein the base panel further comprises:
at least one position-limiting recess transversally formed on a surface of the base panel,
wherein when the tablet PC stands on the base panel, the tablet PC is received in the position-limiting recess.

9. The portable electronic device according to claim 8, wherein the tablet PC further comprises:
at least one first magnetic member disposed at one side of the tablet PC; and
the base panel comprises at least one second magnetic member, the at least one second magnetic member is disposed in the position-limiting recess and correspondingly aligned to the first magnetic member,
wherein when the tablet PC stands on the base panel, the tablet PC is limited in the position-limiting recess because the first magnetic member and the second magnetic member are magnetically attracted with each other.

10. The portable electronic device according to claim 9, wherein the tablet PC further comprises:
at least one third magnetic member disposed at one side of the tablet PC; and
the base panel comprises at least one fourth magnetic member, the at least one fourth magnetic member is disposed at one side of the base panel and correspondingly aligned to the third magnetic member,
wherein when the tablet PC stacks on the base panel, the tablet PC is limited on the base panel because the third magnetic member and the fourth magnetic member are magnetically attracted with each other.

11. The portable electronic device according to claim 10, wherein at least one of the first magnetic member, the second magnetic member, the third magnetic member and the fourth magnetic member is an electromagnet capable of being switched off its magnetic force.

12. The portable electronic device according to claim 8, wherein the tablet PC further comprises:
at least one first electric connector disposed on one surface of the tablet PC opposite to the touch screen;
the base panel comprises at least one second electric connector, the at least one second electric connector is disposed in the position-limiting recess,
wherein when the tablet PC stands on the base panel, the first electric connector is connected to the second electric connector.

13. The portable electronic device according to claim 8, wherein a first vertical differentiation is formed between a first lowest point defined on an inner surface of the position-limiting recess and the surface of the base panel where the position-limiting recess is formed,
a second vertical differentiation is formed between a second lowest point defined on an inner surface of the guide slot being in contact with the bottom transversal shaft and corresponding to the first lowest point, and a highest point defined on the inner surface of the guide slot being in contact with the bottom transversal shaft and not corresponding to a highest point of the position-limiting recess,
wherein the first vertical differentiation is greater than the second vertical differentiation.

* * * * *